April 3, 1951  G. O. CONNER  2,547,197
ECCENTRIC ADJUSTING MECHANISM
Filed Aug. 17, 1945  8 Sheets-Sheet 2

INVENTOR.
GUY O. CONNER
BY
his attorneys

April 3, 1951 G. O. CONNER 2,547,197
ECCENTRIC ADJUSTING MECHANISM
Filed Aug. 17, 1945 8 Sheets-Sheet 3
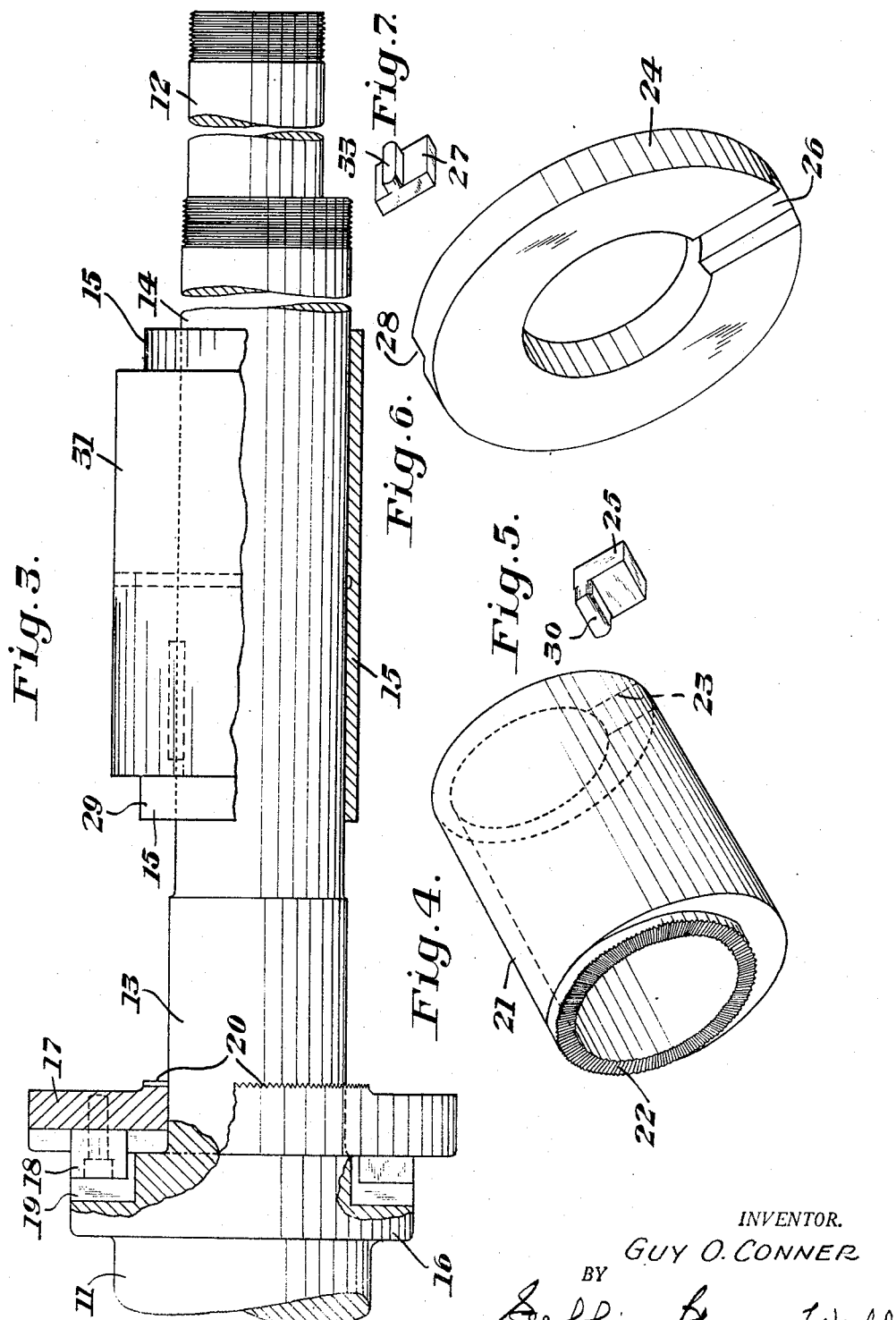
INVENTOR.
GUY O. CONNER
BY
his attorneys April 3, 1951  G. O. CONNER  2,547,197
ECCENTRIC ADJUSTING MECHANISM
Filed Aug. 17, 1945  8 Sheets-Sheet 4
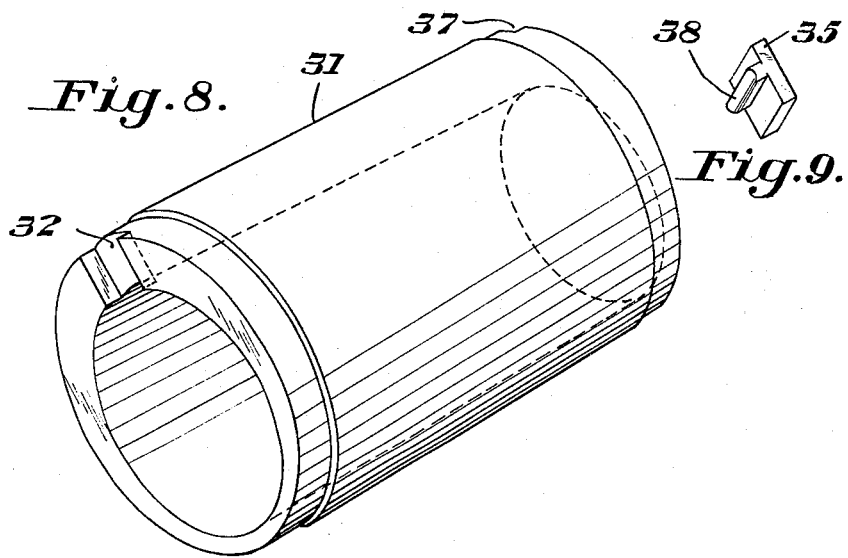
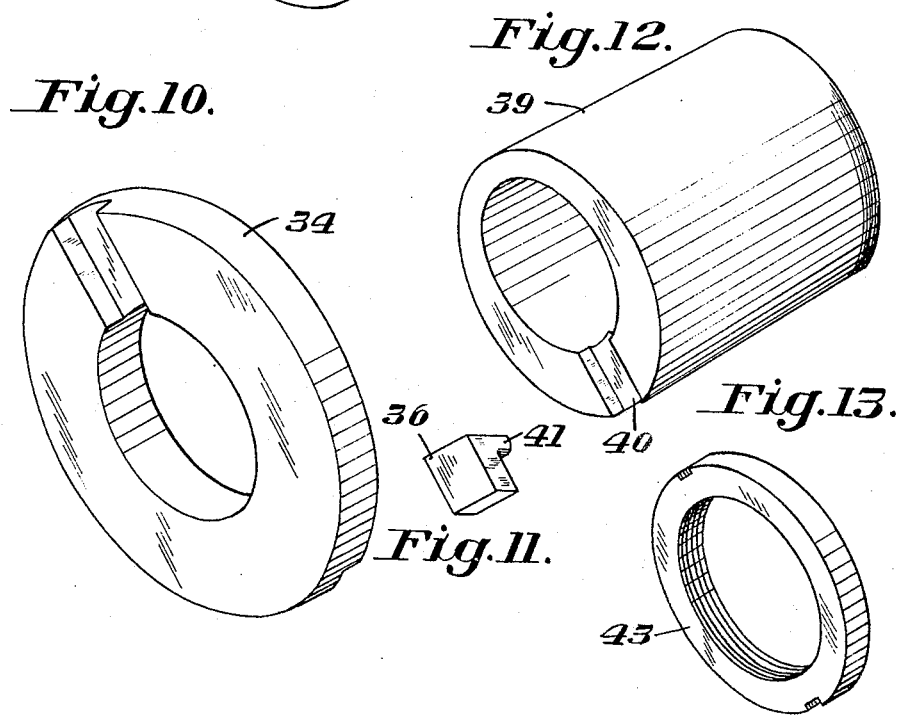
INVENTOR.
GUY O. CONNER.
BY
*his attorneys*

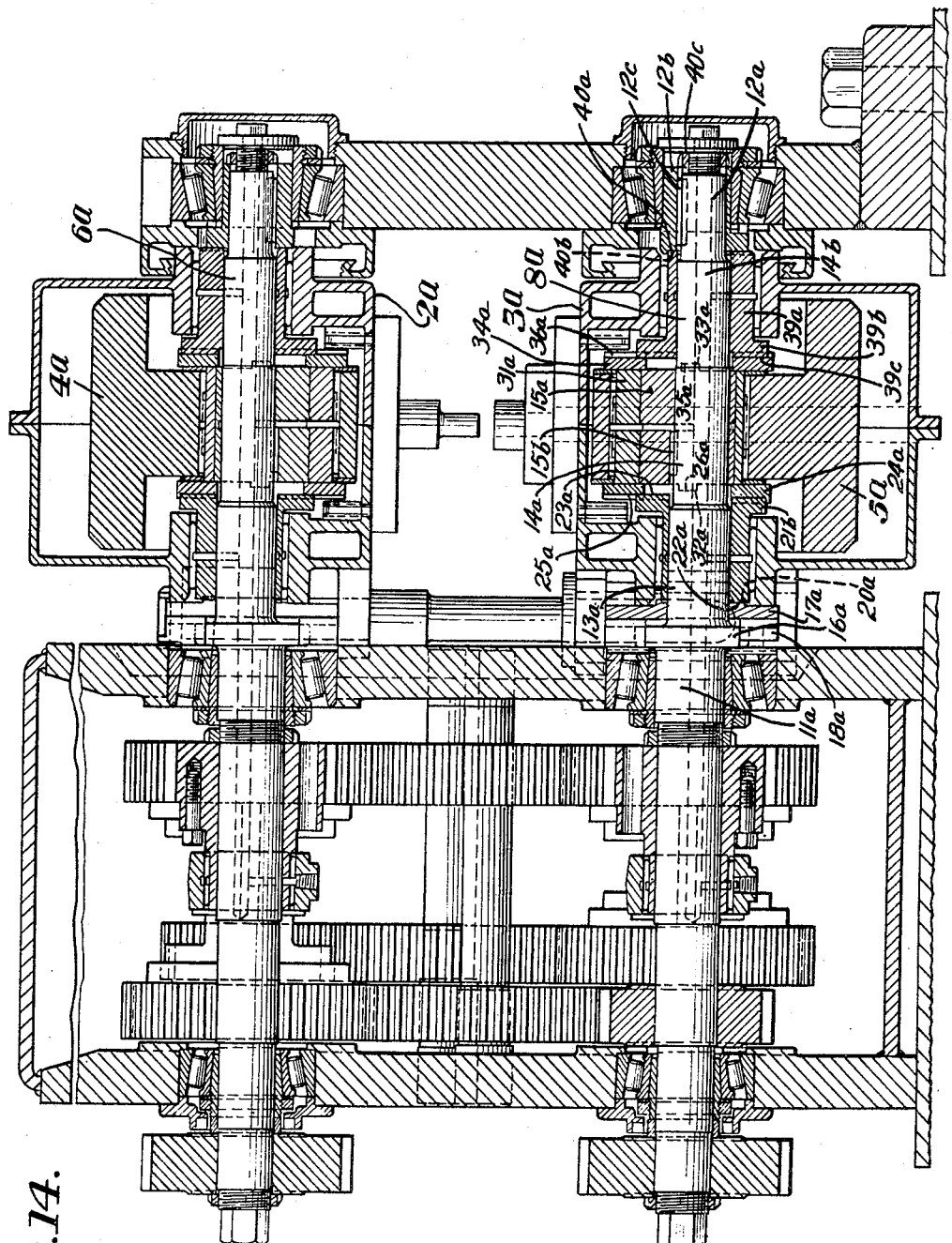

April 3, 1951 G. O. CONNER 2,547,197
ECCENTRIC ADJUSTING MECHANISM
Filed Aug. 17, 1945 8 Sheets-Sheet 6

INVENTOR
GUY O. CONNER.

April 3, 1951 G. O. CONNER 2,547,197
ECCENTRIC ADJUSTING MECHANISM
Filed Aug. 17, 1945 8 Sheets-Sheet 7
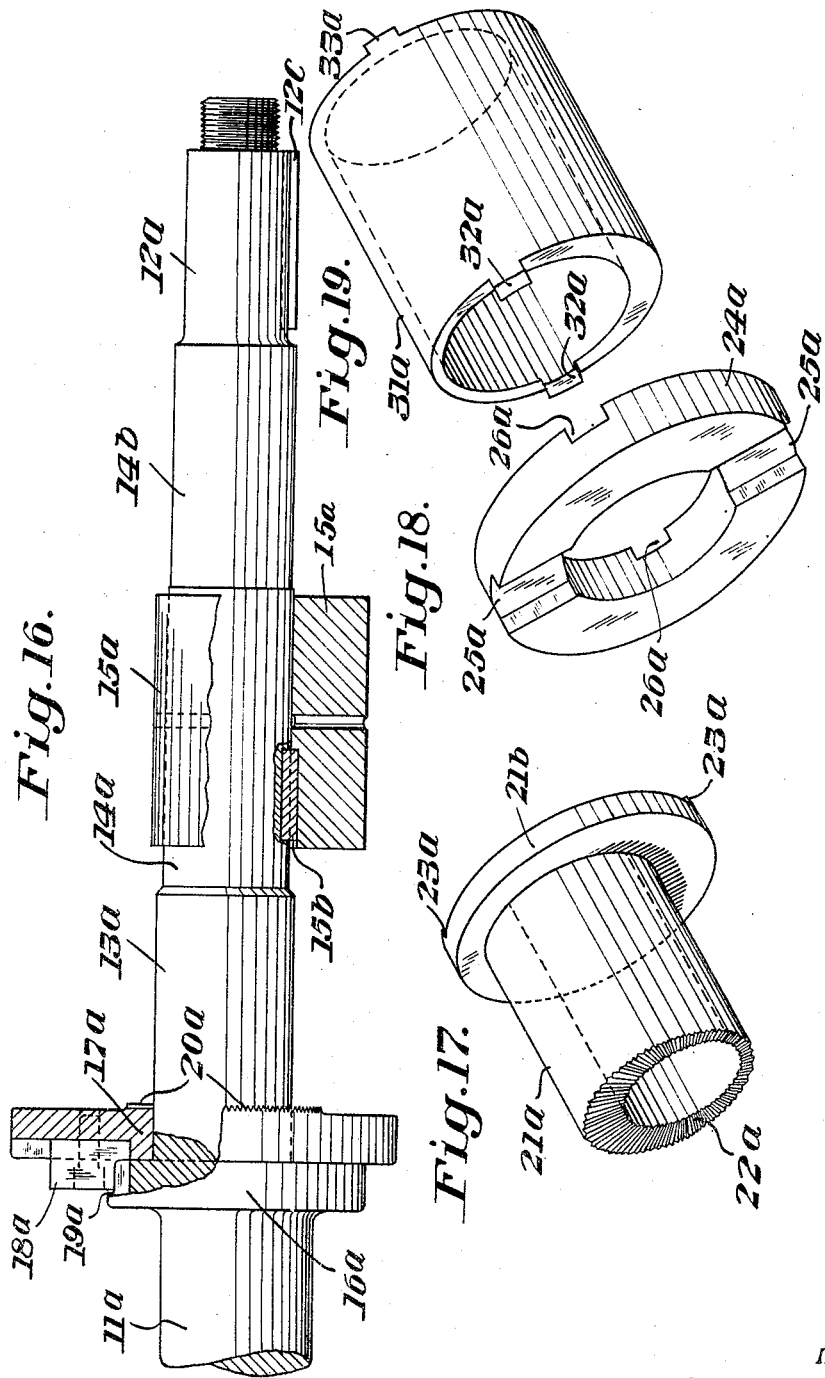
INVENTOR.
GUY O. CONNER
BY April 3, 1951  G. O. CONNER  2,547,197
ECCENTRIC ADJUSTING MECHANISM
Filed Aug. 17, 1945  8 Sheets-Sheet 8

INVENTOR.
GUY O. CONNER
BY
his attorney

Patented Apr. 3, 1951

2,547,197

UNITED STATES PATENT OFFICE 2,547,197

ECCENTRIC ADJUSTING MECHANISM

Guy O. Conner, Cleveland Heights, Ohio, assignor, by mesne assignments, to Danly Machine Specialties, Inc., a corporation of Illinois Application August 17, 1945, Serial No. 611,080

25 Claims. (Cl. 74—571)

This invention relates to eccentric adjusting mechanism, particularly in machines in which adjustable eccentrics are employed in transmitting motion to parts of the machines. The invention is adaptable for use in forming machines, such, for example, as the forming machine disclosed in my copending application Serial No. 497,792 now Patent #2,406,808. Such a forming machine may comprise upper and lower heads each partaking of orbital movement and which cooperate to perform operations on moving work. For example, the heads may carry dies which stamp or otherwise form work passing through the machine. Each head may, for example, be mounted on two parallel shafts rotating in the same direction. Thus the machine may comprise four parallel shafts, two in a horizontal plane and the other two in a second horizontal plane below the first two, each upper shaft being in the same vertical plane as one of the lower shafts. The two upper shafts rotate in one direction and the two lower shafts rotate in the opposite direction. The four shafts carry eccentrics upon which the heads are mounted. Thus when the shafts are operating the respective heads move in orbits so that the dies or other working means carried thereby periodically cooperate to act on the work, at the same time moving laterally.

It is desirable in forming machines of the type above referred to to counterbalance the heads by counterweights. Counterweights of one type are disclosed in my said copending application and other and improved counterweight structures are disclosed in my copending application Serial No. 579,405 now Patent #2,407,254. There may be a counterweight for counterbalancing the upper head and a counterweight for counterbalancing the lower head. The counterweight for counterbalancing the upper head may be mounted on the same two shafts on which the upper head is mounted and the counterweight for counterbalancing the lower head may be mounted on the same two shafts on which the lower head is mounted. Each counterweight is mounted on eccentrics carried by the shafts. The eccentrics are so constructed and arranged that each counterweight exerts its force on the shafts carrying it at any given instant in a direction substantially opposite the direction in which the head carried by those shafts is exerting its force at the same instant. To bring about this result the high points, or points farthest removed from the shaft axis, of the eccentrics carrying the head should be disposed substantially in the opposite direction from the shaft axis relatively to the high points of the eccentrics carrying the corresponding counterweight. Normally the high points of the eccentrics carrying the head will be disposed 180° about the shaft axis from the high points of the eccentrics carrying the counterweight although in certain cases this angular relationship might be slightly varied depending on the conditions of operation.

To render a forming machine of the type referred to adaptable for various operations and for operating on work of various thicknesses and characteristics it is desirable that the eccentricity or throw of the eccentrics carrying the heads be adjustable. But in order that the counterweights may properly counterbalance the heads the eccentricity or throw of the eccentrics carrying the counterweights should likewise be adjustable. Moreover, the eccentrics carrying the counterweights should be disposed in predetermined relationship angularly of the shafts to the eccentrics carrying the heads.

The present invention has to do particularly with mechanism for adjusting the eccentrics so that when the throw of the eccentrics carrying the heads is adjusted the throw of the eccentrics carrying the counterweights will likewise be adjusted and the respective eccentrics will automatically maintain proper angular relationship about the shafts upon which they are mounted.

To provide for adjustment of the throw of the heads and counterweights I mount each head and each counterweight on an eccentric carried by the supporting shaft with an eccentric sleeve disposed about the eccentric so that the resultant eccentric device acting on the head or counterweight as the case may be consists of the eccentric on the shaft and the eccentric sleeve thereabout, in other words an eccentric and eccentric sleeve combination or resultant eccentric made up of an eccentric with an eccentric sleeve thereabout. The throw of the resultant eccentric is altered by turning the eccentric sleeve upon the eccentric upon which it is mounted. I provide means for insuring turning of the eccentric sleeves carrying the heads and the eccentric sleeves carrying the counterweights in controlled relationship so that the high points of the resultant eccentrics carrying the heads are disposed approximately 180° about the shafts from the high points of the resultant eccentrics carrying the counterweights.

I have chosen to illustrate as the present preferred embodiments of the invention two forms of mechanism of which one accomplishes the desired result approximately but not with precise accuracy while the other accomplishes the desired result with precise accuracy. The first mentioned structure is satisfactory for many uses even though it is not perfectly accurate.

I provide mechanism of the class described comprising a shaft having two eccentrics thereon, an eccentric sleeve mounted and adjustably turnable on each eccentric and means connected with the respective eccentric sleeves operated by adjustably turning one of the eccentric sleeves on the eccentric on which it is mounted effective to turn the other eccentric sleeve on the eccentric on which it is mounted to such an extent that the resultant high points of the respective eccentric and eccentric sleeve combinations are always disposed substantially in predetermined relationship. I preferably employ means connected with one of the eccentric sleeves operated by adjustably turning that sleeve on the eccentric on which it is mounted and means connected with the first mentioned means and with the other eccentric sleeve operated by the first mentioned means to turn the other eccentric sleeve.

Normally the two eccentrics on the shaft will have their high points disposed substantially in opposite directions from the shaft axis and an eccentric sleeve will be mounted and adjustably turnable on each eccentric, the eccentric sleeves being disposed relatively to the respective eccentrics on which they are mounted so that when one of the eccentric sleeves has its high point in the same plane containing and in the same direction from the shaft axis as the high point of the eccentric on which it is mounted the other eccentric sleeve is substantially similarly disposed relatively to the eccentric on which it is mounted, and means are preferably provided which are connected with the respective eccentric sleeves and are operated by adjustably turning one of the eccentric sleeves on the eccentric on which it is mounted to turn the other eccentric sleeve on the eccentric on which it is mounted to such an extent that the resultant high points of the respective eccentric and eccentric sleeve combinations are always disposed substantially in opposite directions from the shaft axis.

I further provide mechanism of the class described comprising a shaft having thereon two eccentrics, an eccentric sleeve mounted and adjustably turnable on each eccentric, a guide member operatively interposed between the two sleeves and interengaging means on the sleeves and the guide member so constructed and arranged that upon rotation of one sleeve relatively to the eccentric upon which it is mounted the other sleeve through said guide member is rotated relatively to the eccentric upon which it is mounted to maintain substantially a predetermined relationship between diameters of the respective eccentric sleeves passing through the high points of said sleeves. I preferably provide interengaging means connected with one of the sleeves and the guide member guiding that sleeve for movement relatively to the guide member generally radially of the shaft and interengaging means connected with the other sleeve and the guide member guiding such other sleeve for movement relatively to the guide member generally radially of the shaft and generally parallel to the aforementioned guided movement of the first mentioned sleeve relatively to the guide member.

I provide for guiding the eccentric sleeves for relative movement with substantially fixed orientation relatively to each other when they are adjustably turned on their respective eccentrics. The guide member is preferably an annular member and it may be disposed about the shaft between the two sleeves. Interengaging means are provided which are connected with the sleeves and the annular guide member for guiding the sleeves for relative movement with substantially fixed orientation relatively to each other when they are adjustably turned on their respective eccentrics.

In one form of mechanism the guide member may be mounted on the shaft and guided to turn about the shaft axis. Parallel radial guide means may be provided on the respective sleeves and guide pins on the guide member may cooperate with said respective guide means whereby the sleeves are guided for relative movement with substantially fixed orientation relatively to each other when they are adjustably turned on their respective eccentrics.

Alternatively the guide member may have a bore through which the shaft passes and which is of substantially greater diameter than the shaft so that the guide member is free to move transversely of the shaft, and interengaging means may be provided which are connected with the sleeves and the guide member for guiding the sleeves for relative movement with substantially fixed orientation relatively to each other when they are adjustably turned on their respective eccentrics. The guide means may take the form of elongated projection and groove guide means acting between one of the sleeves and the guide member guiding said sleeve for movement relatively to the guide member generally radially of the shaft and elongated projection and groove guide means acting between the other sleeve and the guide member guiding such other sleeve for movement relatively to the guide member generally radially of the shaft but substantially at right angles to the aforementioned guided movement of the first mentioned sleeve relatively to the guide member.

Other details, objects and advantages of the invention will become apparent as the following description of certain present preferred embodiments of the invention proceeds.

In the accompanying drawings I have shown certain present preferred embodiments of the invention, in which Figure 1 is a vertical cross-sectional view through a forming machine showing one form of my eccentric adjusting mechanism, the section being taken transversely of the direction of feed of work through the machine;

Figure 3 is an enlarged fragmentary view partly in elevation and partly in cross-section through a portion of one of the shafts;

Figure 4 is a perspective view of one of two eccentric sleeves upon which one of the heads is mounted;

Figure 5 is a perspective view of a guiding member;

Figure 6 is a perspective view of an annular member to which the guiding members of Figures 5 and 7 are adapted to be connected to form a composite guiding member;

Figure 7 is a perspective view of a guiding member;

Figure 8 is a perspective view of an eccentric sleeve upon which one of the counterweights is mounted;

Figure 9 is a perspective view of a guiding member;

Figure 10 is a perspective view of an annular member to which the guiding members of Figures 9 and 11 are adapted to be connected to form a composite guiding member;

Figure 11 is a perspective view of a guiding member;

Figure 12 is a perspective view of the other of the two eccentric sleeves upon which one of the heads is mounted;

Figure 13 is a perspective view of a retaining nut;

Figure 14 is a view similar to Figure 1 showing a different form of structure;

Figure 16 is a view similar to Figure 3 of the structure shown in Figure 14 but to somewhat smaller scale;

Figure 17 is a perspective view of one of two eccentric sleeves upon which one of the heads is mounted;

Figure 18 is a perspective view of an annular guiding member;

Figure 19 is a perspective view of an eccentric sleeve upon which one of the counterweights is mounted;

Figure 1:
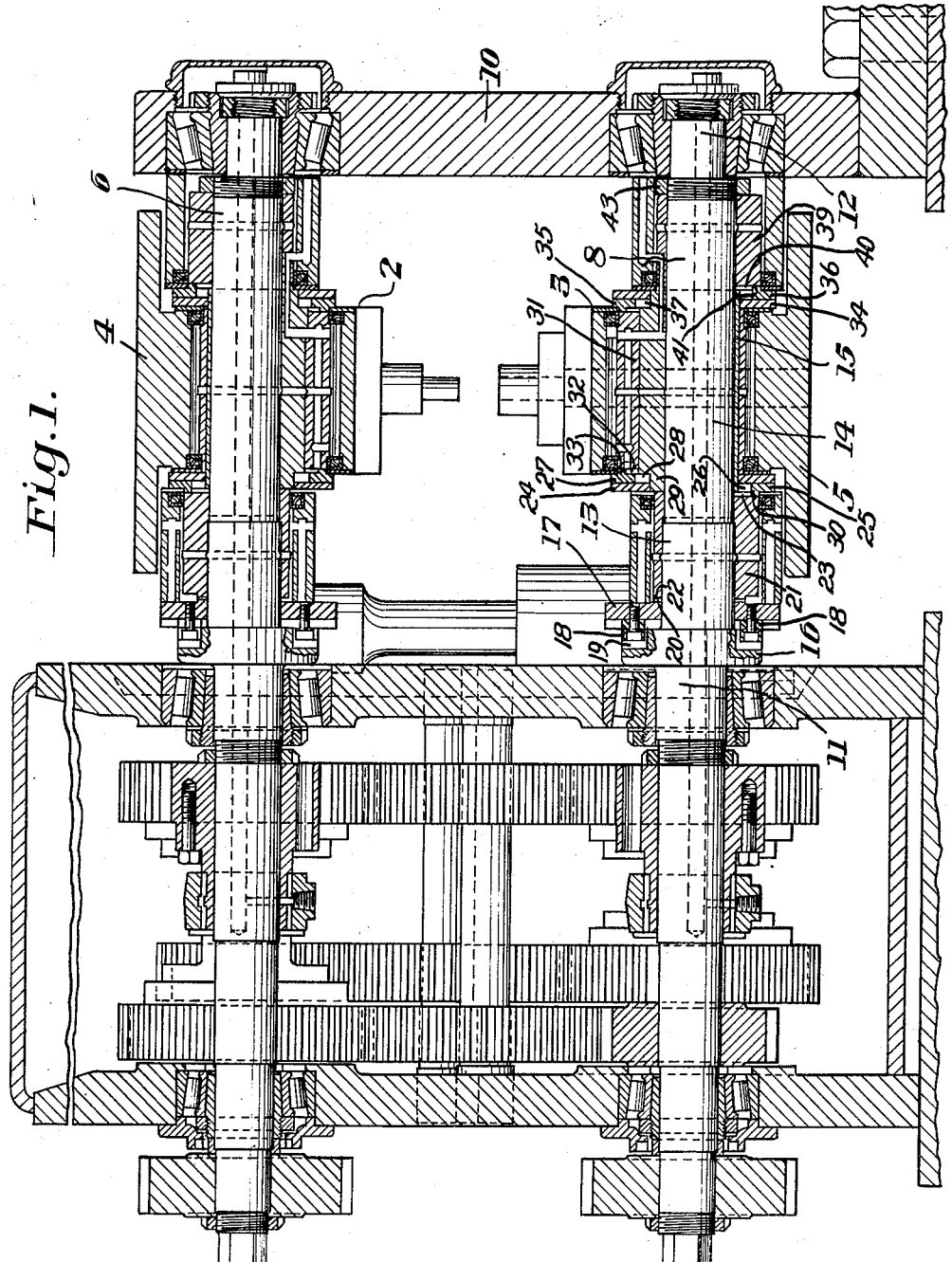

Referring now more particularly to the structure shown in Figures 1 to 13, inclusive, there is shown a forming machine having an upper forming head 2, a lower forming head 3, an upper counterweight 4 and a lower counterweight 5. The upper head 2 and the upper counterweight 4 are mounted on two parallel upper shafts 6 and 7. The lower head 3 and the lower counterweight 5 are mounted on two parallel lower shafts 8 and 9. All four of the shafts 6, 7, 8 and 9 are parallel to one another, the shafts 6 and 7 lying in a horizontal plane and the shafts 8 and 9 lying in a lower horizontal plane. The shafts 6 and 8 lie in the same vertical plane and the shafts 7 and 9 lie in the same vertical plane.

Figure 2:
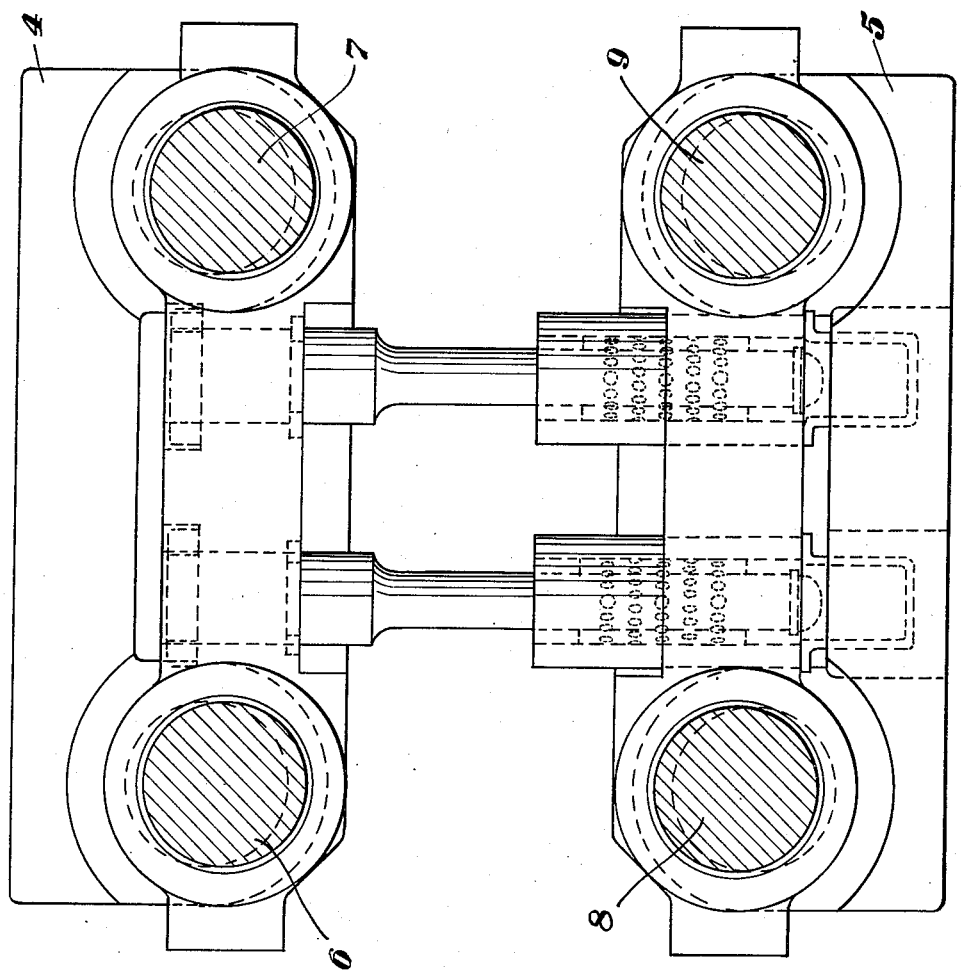
Figure 2 is a vertical longitudinal cross-sectional view to enlarged scale through the forming machine shown in Figure 1.

The shafts 6 and 7 are rotated in one direction and the shafts 8 and 9 are rotated in the opposite direction. Referring to Figure 2, if, for example, the shafts 6 and 7 rotate clockwise the shafts 8 and 9 rotate counterclockwise. All four shafts are rotated in unison at the same speed by any suitable driving mechanism, such, for example, as the driving mechanisms shown in my said copending applications. Driving mechanism for the shafts is shown at the left hand side of Figure 1, but since the driving mechanism forms no part of the present invention it will not be described in detail. The outer or right hand ends of the shafts viewing Figure 1 are mounted in outboard bearings 10.

One of the shafts is shown fragmentarily to enlarged scale in Figure 3. It comprises concentric portions 11 and 12 for journaling the shaft for rotation and, intermediate those concentric portions, an eccentric portion comprising a part 13 and a part 14, the part 13 being relatively short axially and of somewhat greater diameter than the part 14. The part 13 forms an eccentric for mounting one of the heads, as, for example, the lower head 3. Likewise the right hand end of the part 14, viewing Figure 3, forms another eccentric for mounting the same head. The head straddles the counterweight which is mounted about the left hand portion of the eccentric part 14 of the shaft. In Figure 3 the high points of the eccentrics for mounting the head are disposed downwardly. The eccentric for mounting the counterweight is shown at 15, being keyed to the shaft, and its high point extending upwardly or diametrically opposite the high points of the eccentrics for the head.

The shaft has a radial flange 16 against which lies a member 17 which through projecting portions 18 bolted thereto and which respectively enter recesses 19 in the flange 16 is held against turning movement relatively to the shaft. The member 17 has a circumferential series of teeth 20 facing axially toward the right viewing Figure 3. An eccentric sleeve 21 (Figure 4) is mounted on the eccentric part 13 and has teeth 22 normally in mesh with the teeth 20. The sleeve 21 in its normal position is disposed relatively to the eccentric 13 so that the high point of the sleeve is in the same plane containing and in the same direction from the shaft axis as the high point of the eccentric. In its end face remote from the end having the teeth 22 the sleeve 21 has a radial groove 23 which passes through the high point of the eccentric sleeve. An annular member 24 (Figure 6) is mounted on the shaft to the right of the sleeve 21 and has a guiding member 25 (Figure 5) disposed in a radial groove 26 in its face nearer the sleeve 21 and a guiding member 27 (Figure 7) disposed in a radial groove 28 in its face remote from the sleeve 21. The guiding members 25 and 27 are adapted to be fastened to the annular member 24 in any desired way so that the members 24, 25 and 27 form in effect an integral annular guide member. This guide member has a bore through which it is guided to turn about the axis of the shaft. The member 24 is disposed over the portion 29 of the eccentric 15 (see Figure 3). The circumference of the eccentric 15 in the form shown is coaxial with the shaft. The guiding member 25 has a projection 30 extending into the groove 23 of the sleeve 21.

Mounted over the eccentric 15 is an eccentric sleeve 31 (Figure 8) having a radial groove 32 in its end face disposed toward the member 24 and adapted to receive a projection 33 of the member 27. The sleeve 31 is normally disposed with its high point in the same plane containing and in the same direction from the shaft axis as the high point of the eccentric 15.

Mounted next the sleeve 31 is a member 34 (Figure 10) similar to the member 24 and having guiding members 35 (Figure 9) and 36 (Figure 11) connected therewith and operating similarly to the guiding members 25 and 27 above referred to. The sleeve 31 has a radial groove 37 opposed to the radial groove 32 and which receives the member 35.

Next to the member 34 at the face thereof at which the member 36 projects is an eccentric sleeve 39 having its end face nearer the member 34 and intersecting its high point a radial groove 40 receiving a projection 41 of the member 36. The eccentric 39 is disposed over the portion 14 of the shaft to the right of the eccentric 15. The high point of the sleeve 39 is in the same plane containing and in the same direction from the shaft axis as the high point of the eccentric 14. A retaining nut 43 is threaded on the shaft and bears against the right hand end of the sleeve 39 to hold the members assembled.

The mechanism described insures that the high points of the composite eccentrics consisting of the respective eccentrics and their eccentric sleeves for mounting the head on the one hand and for mounting the counterweight on the other hand will always be positioned approximately in opposite directions from the shaft axis. If for example the eccentric sleeve 31 is turned it will cause the two guide members 24 and 34 to turn and they will turn the sleeves 21 and 39. If the sleeves 21 and 39 are turned relatively to the sleeve 31 so that diameters of the respective sleeves passing through their high points are maintained parallel to each other the composite eccentrics will have their high points disposed diametrically opposite one another, which is desired. This condition will not be exactly attained when the structure of Figures 1 to 13, inclusive, is employed because the members 24 and 34 are constrained to turn about the axis of the shaft and since the eccentrics turn about axes which are offset from the axis of the shaft the result is an angular movement of the members 24 and 34 which results in a relative angular movement between the eccentric sleeves 21 and 39 on the one hand and the eccentric sleeve 31 on the other hand and throws the diameters above referred to out of parallelism. However, the result is approximately attained with the structure of Figures 1 to 13, inclusive, which is satisfactory for most purposes.

In order to enable the eccentric sleeves and the members 24 and 34 to turn relatively to the shaft it is necessary that the teeth 20 and 22 be disengaged. This is accomplished by loosening the nut 43 to allow the sleeves to move slightly toward the right, viewing Figure 3, on the shaft. As a matter of fact it is preferred to hold the eccentric sleeves 21 and 39 stationary relatively to the head and turn the shaft therein to accomplish the adjustment but this is the subject matter of my copending application Serial No. 611,081 now Patent #2,541,573.

Referring now more particularly to the structure of Figures 14 to 23, inclusive, there is shown a forming machine having an upper forming head 2a, a lower forming head 3a, an upper counterweight 4a and a lower counterweight 5a. The upper head 2a and the upper counterweight 4a are mounted on two parallel upper shafts 6a and 7a. The lower head 3a and the lower counterweight 5a are mounted on two parallel lower shafts 8a and 9a. All four of the shafts 6a, 7a, 8a and 9a are parallel to one another, the shafts 6a and 7a lying in a horizontal plane and the shafts 8a and 9a lying in a lower horizontal plane. The shafts 6a and 8a lie in the same vertical plane and the shafts 7a and 9a lie in the same vertical plane.

Figure 15:
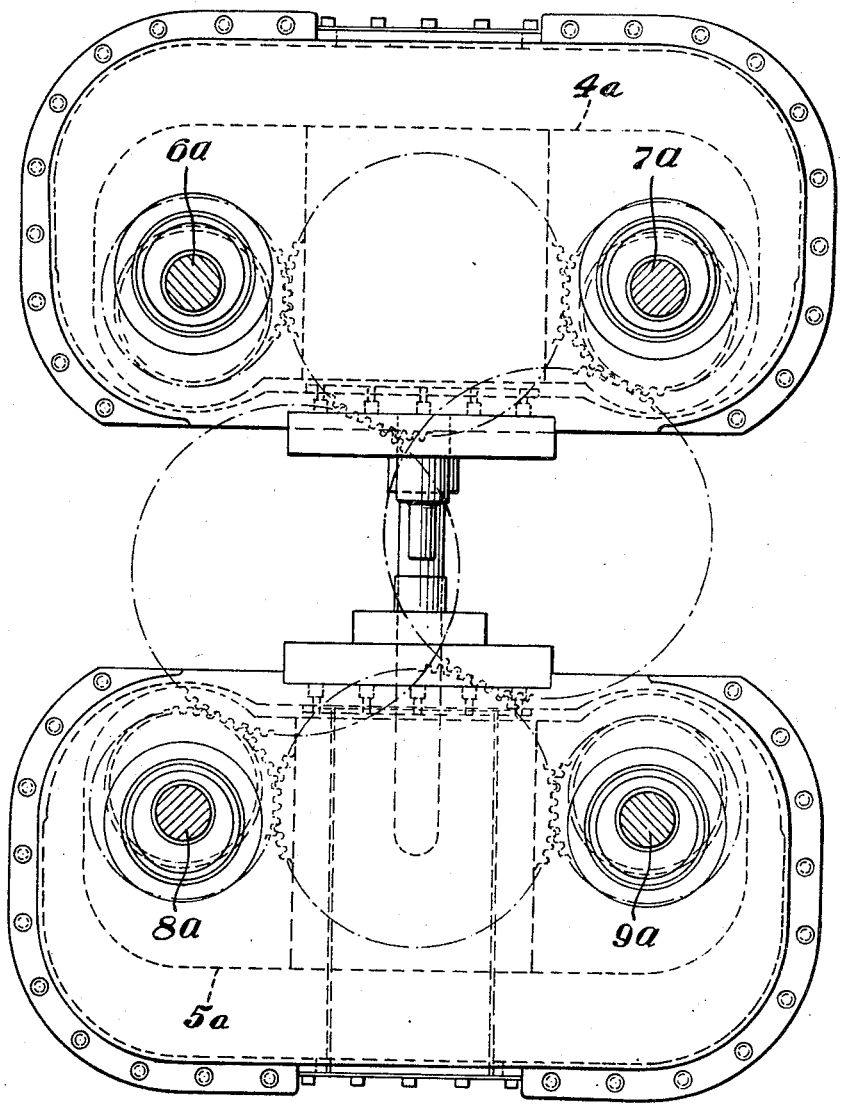
Figure 15 is a vertical longitudinal cross-sectional view of the structure shown in Figure 14.
Figure 20:
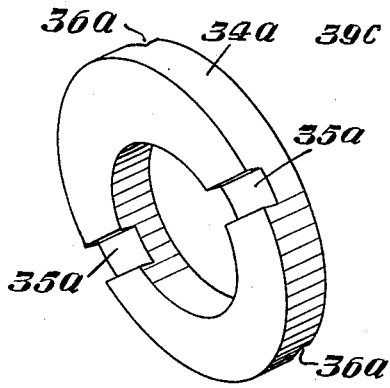
Figure 20 is a perspective view of an annular guiding member.
Figure 21:
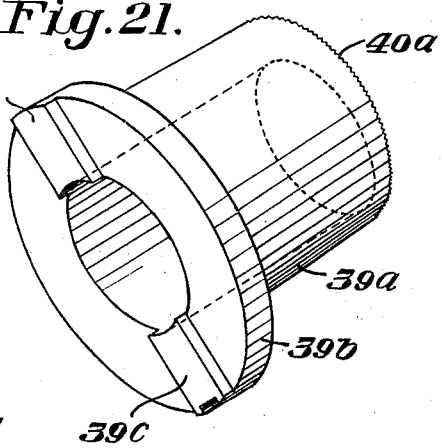
Figure 21 is a perspective view of the other of the two eccentric sleeves upon which one of the heads is mounted.
Figure 22:
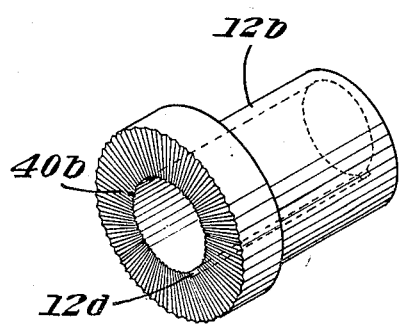
Figure 22 is a perspective view of a retaining member.
Figure 23:
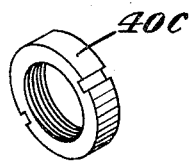
Figure 23 is a perspective view of a retaining nut.

The shafts 6a and 7a are rotated in one direction and the shafts 8a and 9a are rotated in the opposite direction. Referring to Figure 15, if, for example, the shafts 6a and 7a rotate clockwise the shafts 8a and 9a rotate counterclockwise. All four shafts are rotated in unison at the same speed by any suitable driving mechanism as above explained in connection with the structure shown in Figures 1 to 13, inclusive. A driving mechanism for the shafts is shown at the left hand side of Figure 14, but since the driving mechanism forms no part of the present invention it will not be described in detail. The outer or right hand ends of the shafts viewing Figure 14 are mounted in outboard bearings 10a.

One of the shafts is shown fragmentarily to enlarged scale in Figure 16. It comprises portions 11a and 12a for journaling the shaft for rotation and, intermediate those portions, eccentric portions 13a, 14a and 14b. The portion 11a is concentric with the shaft axis. The portion 12a is eccentric with respect to the shaft axis but is adapted to receive thereover an eccentric sleeve 12b (Figure 22) keyed thereto by a key 12c entering a keyway 12d. When the eccentric sleeve 12b is applied to the shaft portion 12a the outer cylindrical surface of the sleeve 12b is concentric with the shaft axis. Therefore the shaft rotates in bearings cooperating with the portion 11a of the shaft and the sleeve 12b keyed to the shaft.

The eccentric shaft portions 13a and 14b form eccentrics for mounting one of the heads, as, for example, the lower head 3a. The head straddles the counterweight which is mounted about the eccentric shaft portion 14a. In Figure 16 the high points of the eccentrics 13a and 14b are disposed upwardly. The eccentric for mounting the counterweight is shown at 15a, being keyed to the shaft and its high point extending downwardly or diametrically opposite the high points of the eccentrics 13a and 14b. The eccentric 15a is applied to the shaft at the eccentric portion 14a thereof as shown in Figure 16, being keyed thereto by a key 15b.

The shaft has a radial flange 16a against which lies a member 17a which through projections 18a bolted thereto and which respectively enter recesses 19a in the flange 16a is held against turning movement relatively to the shaft. Only one projecting portion 18a is shown in Figure 16 but two or more may be provided. The member 17a has a circumferential series of teeth 20a facing axially toward the right viewing Figure 16.

An eccentric sleeve 21a (Figure 17) having a radial flange 21b is mounted on the eccentric 13a and has teeth 22a normally in mesh with the teeth 20a. The sleeve 21a in its normal position is disposed relatively to the eccentric 13a so that the high point of the sleeve is in the same plane containing and in the same direction from the shaft axis as the high point of the eccentric. In its end face the flange 21b has radial projections 23a which are radially aligned with each other and one of which passes through the high point of the eccentric sleeve 21a. An annular member 24a (Figure 18) is disposed about the shaft to the right of the sleeve 21a and has in its left hand face viewing Figure 18 aligned radial slots 25a and in its right hand face aligned radial slots 26a, the slots 25a extending at right angles to the slots 26a, as shown in Figure 18.

The bore of the annular member 24a is much larger than the shaft so that the member 24a is free to move transversely of the shaft as well as angularly. The radial projections 23a enter and are guidingly received by the slots 25a so that the sleeve 21a and the annular member 24a may not rotate relatively to one another but may partake only of relative movement longitudinally of the projections 23a, this being permitted because the bore of the member 24a is larger than the shaft.

Mounted over the eccentric 15a is an eccentric sleeve 31a (Figure 19) having aligned radial projections 32a at its left hand face and aligned radial projections 33a at its right hand face.

The projections 32a and 33a are all in the same plane containing the shaft axis which extends at right angles to a plane containing the shaft axis and passing through the high point of the eccentric sleeve 31a. The projections 32a enter and are guidingly received by the slots 26a in the right hand face of the annular member 24a. Thus the annular member 24a and the sleeve 31a may not relatively rotate but may partake of relative movement longitudinally of the slots 26a. The sleeve 31a is normally disposed with its high point in the same plane containing and in the same direction from the shaft axis as the high point of the eccentric 15a.

Mounted next the sleeve 31a is a member 34a (Figure 20) similar to the member 24a and having aligned radial slots 35a in its left hand and aligned radial slots 36a in its right hand face, the slots 35a extending at right angles to the slots 36a. The member 34a like the member 24a has a bore larger than the shaft so that the member 34a may move transversely of the shaft. The projections 33a enter and are guidingly received by the slots 35a in the left hand face of the annular member 34a.

Mounted on the eccentric 14b is an eccentric sleeve 39a having a flange 39b having aligned radial projections 39c, the eccentric sleeve 39a being similar to the eccentric sleeve 21a. The projections 39c extend through the high point of the sleeve 39a. The high point of the sleeve is normally in the same plane containing and in the same direction from the shaft axis as the high point of the eccentric 14c. The projections 39c enter and are guidingly received by the slots 36a of the annular member 34a. Thus the member 34a and the sleeve 39a may not relatively rotate but may move relatively to each other longitudinally of the projections 39c. In its right hand face the eccentric sleeve 39a has teeth 40a adapted to mesh with teeth 40b on the eccentric sleeve 12b. A retaining nut 40c (Figure 23) is threaded onto the shaft and bears against the right hand end of the sleeve 12b to hold the members assembled.

When one of the eccentric sleeves 21a and 39a is turned it will, through the mechanism shown, correspondingly turn the other of such sleeves and will also turn the eccentric sleeve 31a so as to maintain parallel planes through the shaft axis and through the high points of the eccentric sleeves 21a, 39a and 31a. The result of this is to maintain the high points of the resultant eccentrics or eccentric and eccentric sleeve combinations for the head and counterweight respectively directly opposite each other relatively to the shaft axis. This insures that the head and counterweight will always act on the shaft in opposite directions. The structure of Figures 14 to 23, inclusive, accomplishes the result precisely and accurately due to the fact that the annular members 24a and 34a are not constrained to turn about the axis of the shaft but may moved transversely of the shaft while relatively guiding the eccentric sleeves. As with the structure of Figures 1 to 13, inclusive, in order to enable the eccentric sleeves and the members 24a and 34a to turn relatively to the shaft it is necessary that the teeth 20a and 22a be disengaged and that the teeth 40a and 40b be disengaged. This is accomplished by loosening the nut 40c to allow the sleeves to move slightly toward the right, viewing Figure 16, on the shaft. Then when the desired adjustment has been made the nut 40c is again tightened and the parts are held in relatively fixed position on the shaft.

While I have shown and described certain present preferred embodiments of the invention it is to be distinctly understood that the invention is not limited thereto but may be otherwise variously embodied within the scope of the following claims.

I claim:

1. Mechanism of the class described comprising a shaft having thereon two eccentrics whose high points are disposed substantially in opposite directions from the shaft axis, an eccentric sleeve mounted and adjustably turnable on each eccentric, the eccentric sleeves being disposed relatively to the respective eccentrics on which they are mounted so that when one of the eccentric sleeves has its high point in the same plane containing and in the same direction from the shaft axis as the high point of the eccentric on which it is mounted the other eccentric sleeve is substantially similarly disposed relatively to the eccentric on which it is mounted, and means separate from the shaft connected with the respective eccentric sleeves operated by adjustably turning one of the eccentric sleeves on the eccentric on which it is mounted effective to turn the other eccentric sleeve on the eccentric on which it is mounted to such an extent that the resultant high points of the respective eccentric and eccentric sleeve combinations are always disposed substantially in opposite directions from the shaft axis.

2. Mechanism of the class described comprising a shaft having two eccentrics thereon, an eccentric sleeve mounted and adjustably turnable on each eccentric and means separate from the shaft connected with the respective eccentric sleeves operated by adjustably turning one of the eccentric sleeves on the eccentric on which it is mounted effective to turn the other eccentric sleeve on the eccentric on which it is mounted to such an extent that the resultant high points of the respective eccentric and eccentric sleeve combinations are always disposed substantially in predetermined relationship.

3. Mechanism of the class described comprising a shaft having two eccentrics thereon, an eccentric sleeve mounted and adjustably turnable on each eccentric, means connected with one of the eccentric sleeves operated by adjustably turning that sleeve on the eccentric on which it is mounted and means separate from the shaft connected with said first mentioned means and with the other eccentric sleeve operated by said first mentioned means to turn the other eccentric sleeve on the eccentric on which it is mounted to such an extent that the resultant high points of the respective eccentric and eccentric sleeve combinations are always disposed substantially in predetermined relationship.

4. Mechanism of the class described comprising a shaft having thereon two eccentrics whose high points are disposed substantially in opposite directions from the shaft axis, an eccentric sleeve mounted and adjustably turnable on each eccentric, the eccentric sleeves being disposed relatively to the respective eccentrics on which they are mounted so that when one of the eccentric sleeves has its high point in the same plane containing and in the same direction from the shaft axis as the high point of the eccentric on which it is mounted the other eccentric sleeve is substantially similarly disposed relatively to the eccentric on which it is mounted, means connected with one of the eccentric sleeves operated by adjustably turning that sleeve on the eccentric on which it is mounted and means separate from the shaft connected with said first mentioned means and with the other eccentric sleeve operated by said first mentioned means to turn the other eccentric sleeve on the eccentric on which it is mounted to such an extent that the resultant high points of the respective eccentric and eccentric sleeve combinations are always disposed substantially in opposite directions from the shaft axis.

5. Mechanism of the class described comprising a shaft having thereon two eccentrics whose high points are disposed substantially in opposite directions from the shaft axis, an eccentric sleeve mounted and adjustably turnable on each eccentric, the eccentric sleeves being disposed relatively to the respective eccentrics on which they are mounted so that when one of the eccentric sleeves has its high point in the same plane containing and in the same direction from the shaft axis as the high point of the eccentric on which it is mounted the other eccentric sleeve is substantially similarly disposed relatively to the eccentric on which it is mounted, means connected with one of the eccentric sleeves operated by adjustably turning that sleeve on the eccentric on which it is mounted and means separate from the shaft connected with said first mentioned means and with the other eccentric sleeve operated by said first mentioned means to turn the other eccentric sleeve on the eccentric on which it is mounted to maintain substantially parallel to each other diameters of the respective eccentric sleeves passing through the high points of said sleeves.

6. Mechanism of the class described comprising a shaft having thereon two eccentrics whose high points are disposed substantially in predetermined relationship, an eccentric sleeve mounted and adjustably turnable on each eccentric, the eccentric sleeves being disposed relatively to the respective eccentrics on which they are mounted so that the high points of the eccentric sleeves are in similar relationship to the high points of the respective eccentrics, means connected with one of the eccentric sleeves operated by adjustably turning that sleeve on the eccentric on which it is mounted and means separate from the shaft connected with said first mentioned means and with the other eccentric sleeve operated by said first mentioned means to turn the other eccentric sleeve on the eccentric on which it is mounted to such an extent that the resultant high points of the respective eccentric and eccentric sleeve combinations are always disposed substantially in predetermined relationship.

7. Mechanism of the class described comprising a shaft having thereon two eccentrics whose high points are disposed substantially in predetermined relationship, an eccentric sleeve mounted and adjustably turnable on each eccentric, the eccentric sleeves being disposed relatively to the respective eccentrics on which they are mounted so that the high points of the eccentric sleeves are in similar relationship to the high points of the respective eccentrics, means connected with one of the eccentric sleeves operated by adjustably turning that sleeve on the eccentric on which it is mounted and means separate from the shaft connected with said first mentioned means and with the other eccentric sleeve operated by said first mentioned means to turn the other eccentric sleeve on the eccentric on which it is mounted to maintain substantially in predetermined relationship to each other diameters of the respective eccentric sleeves passing through the high points of said sleeves.

8. Mechanism of the class described comprising a shaft having thereon two eccentrics whose high points are disposed substantially in predetermined relationship, an eccentric sleeve mounted and adjustably turnable on each eccentric, means connected with one of the eccentric sleeves operated by adjustably turning that sleeve on the eccentric on which it is mounted and means separate from the shaft connected with said first mentioned means and with the other eccentric sleeve operated by said first mentioned means to turn the other eccentric sleeve on the eccentric on which it is mounted to such an extent that the resultant high points of the respective eccentric and eccentric sleeve combinations are always disposed substantially in predetermined relationship.

9. Mechanism of the class described comprising a shaft having thereon two eccentrics whose high points are disposed substantially in predetermined relationship, an eccentric sleeve mounted and adjustably turnable on each eccentric, means connected with one of the eccentric sleeves operated by adjustably turning that sleeve on the eccentric on which it is mounted and means separate from the shaft connected with said first mentioned means and with the other eccentric sleeve operated by said first mentioned means to turn the other eccentric sleeve on the eccentric on which it is mounted to maintain substantially in predetermined relationship to each other diameters of the respective eccentric sleeves passing through the high points of said sleeves.

10. Mechanism of the class described comprising a shaft having thereon two eccentrics, an eccentric sleeve mounted and adjustably turnable on each eccentric, a member operatively interposed between the two sleeves and interengaging means on the sleeves and a guide member so constructed and arranged that upon rotation of one sleeve relatively to the eccentric upon which it is mounted the other sleeve through said guide member is rotated relatively to the eccentric upon which it is mounted to maintain substantially a predetermined relationship between diameters of the respective eccentric sleeves passing through the high points of said sleeves.

11. Mechanism of the class described comprising a shaft having thereon two eccentrics whose high points are disposed substantially in opposite directions from the shaft axis, an eccentric sleeve mounted and adjustably turnable on each eccentric, the eccentric sleeves being disposed relatively to the respective eccentrics on which they are mounted so that when one of the eccentric sleeves has its high point in the same plane containing and in the same direction from the shaft axis as the high point of the eccentric on which it is mounted the other eccentric sleeve is substantially similarly disposed relatively to the eccentric on which it is mounted, a guide member operatively interposed between the two sleeves and interengaging means on the sleeves and the guide member so constructed and arranged that upon rotation of one sleeve relatively to the eccentric upon which it is mounted the other sleeve through said guide member is rotated relatively to the eccentric upon which it is mounted to maintain substantially parallel to each other diameters of the respective eccentric sleeves passing through the high points of said sleeves.

12. Mechanism of the class described comprising a shaft having thereon two eccentrics whose high points are disposed substantially in opposite directions from the shaft axis, an eccentric sleeve mounted and adjustably turnable on each eccentric, the eccentric sleeves being disposed relatively to the respective eccentrics on which they are mounted so that when one of the eccentric sleeves has its high point in the same plane containing and in the same direction from the shaft axis as the high point of the eccentric on which it is mounted the other eccentric sleeve is substantially similarly disposed relatively to the eccentric on which it is mounted, a guide member operatively interposed between the two sleeves, interengaging means connected with one of the sleeves and the guide member guiding said sleeve for movement relatively to the guide member generally radially of the shaft and interengaging means connected with the other sleeve and the guide member guiding such other sleeve for movement relatively to the guide member generally radially of the shaft and generally parallel to the aforementioned guided movement of the first mentioned sleeve relatively to the guide member.

13. Mechanism of the class described comprising a shaft having thereon two eccentrics whose high points are disposed substantially in opposite directions from the shaft axis, an eccentric sleeve mounted and adjustably turnable on each eccentric, the eccentric sleeves being disposed relatively to the respective eccentrics on which they are mounted so that when one of the eccentric sleeve has its high point in the same plane containing and in the same direction from the shaft axis as the high point of the eccentric on which it is mounted the other eccentric sleeve is substantially similarly disposed relatively to the eccentric on which it is mounted, a guide member operatively interposed between the two sleeves and interengaging means connected with the sleeves and the guide member guiding the sleeves for relative movement with substantially fixed orientation relatively to each other when they are adjustably turned on their respective eccentrics.

14. Mechanism of the class described comprising a shaft having two eccentrics thereon, an eccentric sleeve mounted and adjustably turnable on each eccentric, a guide member operatively interposed between the two sleeves and interengaging means connected with the sleeves and the guide member guiding the sleeves for relative movement with substantially fixed orientation relatively to each other when they are adjustably turned on their respective eccentrics.

15. Mechanism of the class described comprising a shaft having two eccentrics thereon, an eccentric sleeve mounted and adjustably turnable on each eccentric, a guide member disposed about the shaft between the two sleeves and interengaging means connected with the sleeves and the guide member guiding the sleeves for relative movement with substantially fixed orientation relatively to each other when they are adjustably turned on their respective eccentrics.

16. Mechanism of the class described comprising a shaft having two eccentrics thereon, an eccentric sleeve mounted and adjustably turnable on each eccentric, an annular guide member mounted on the shaft between the two sleeves and guided to turn about the shaft axis and interengaging means connected with the sleeves and the guide member guiding the sleeves for relative movement with substantially fixed orientation relatively to each other when they are adjustably turned on their respective eccentrics.

17. Mechanism of the class described comprising a shaft having two eccentrics thereon, an eccentric sleeve mounted and adjustably turnable on each eccentric, an annular guide member mounted on the shaft between the two sleeves and guided to turn about the shaft axis and parallel radial guide means on the respective sleeves and guide pins on the guide member cooperating with said respective guide means whereby the sleeves are guided for relative movement with substantially fixed orientation relatively to each other when they are adjustably turned on their respective eccentrics.

18. Mechanism of the class described comprising a shaft having thereon two eccentrics whose high points are disposed substantially in opposite directions from the shaft axis, an eccentric sleeve mounted and adjustably turnable on each eccentric, the eccentric sleeves being disposed relatively to the respective eccentrics on which they are mounted so that when one of the eccentric sleeves has its high point in the same plane containing and in the same direction from the shaft axis as the high point of the eccentric on which it is mounted the other eccentric sleeve is substantially similarly disposed relatively to the eccentric on which it is mounted, an annular guide member mounted on the shaft between the two sleeves and guided to turn about the shaft axis, parallel radial guide means on the respective sleeves, said guide means on one sleeve being disposed substantially in the opposite direction from the shaft axis relatively to said guide means on the other sleeve, and guide pins on the guide member cooperating with said respective guide means to cooperatively guide the sleeves when they are adjustably turned on their respective eccentrics.

19. Mechanism of the class described comprising a shaft having thereon two eccentrics whose high points are disposed substantially in opposite directions from the shaft axis, an eccentric sleeve mounted and adjustably turnable on each eccentric, the eccentric sleeves being disposed relatively to the respective eccentrics on which they are mounted so that when one of the eccentric sleeves has its high point in the same plane containing and in the same direction from the shaft axis as the high point of the eccentric on which it is mounted the other eccentric sleeve is substantially similarly disposed relatively to the eccentric on which it is mounted, an annular guide member mounted on the shaft between the two sleeves and guided to turn about the shaft axis, a radial guide channel in the face of each sleeve disposed toward the guide member, said guide channels in the respective sleeves being similarly positioned relatively to the respective high points of said sleeves, and guide pins on the guide member entering said respective guide channels to cooperatively guide the sleeves when they are adjustably turned on their respective eccentrics.

20. Mechanism of the class described comprising a shaft having two eccentrics thereon, an eccentric sleeve mounted and adjustably turnable on each eccentric, a guide member disposed about the shaft between the two sleeves, the guide member having a bore through which the shaft passes and which is of substantially greater diameter than the shaft so that the guide member is free to move transversely of the shaft, and interengaging means connected with the sleeves and the guide member guiding the sleeves for relative movement with substantially fixed orientation relatively to each other when they are adjustably turned on their eccentrics.

21. Mechanism of the class described comprising a shaft having two eccentrics thereon, an eccentric sleeve mounted and adjustably turnable on each eccentric, a guide member disposed about the shaft between the two sleeves, the guide member having a bore through which the shaft passes and which is of substantially greater diameter than the shaft so that the guide member is free to move transversely of the shaft, and interengaging means connected with each sleeve and the guide member guiding the sleeve for movement relatively to the guide member with substantially fixed orientation relatively to the guide member when the sleeves are adjustably turned on their eccentrics.

22. Mechanism of the class described comprising a shaft having two eccentrics thereon, an eccentric sleeve mounted and adjustably turnable on each eccentric, a guide member disposed about the shaft between the two sleeves, the guide member having a bore through which the shaft passes and which is of substantially greater diameter than the shaft so that the guide member is free to move transversely of the shaft, interengaging means connected with one of the sleeves and the guide member guiding said sleeve for movement relatively to the guide member generally radially of the shaft and interengaging means connected with the other sleeve and the guide member guiding such other sleeve for movement relatively to the guide member generally radially of the shaft but substantially at right angles to the aforementioned guided movement of the first mentioned sleeve relatively to the guide member.

23. Mechanism of the class described comprising a shaft having two eccentrics thereon, an eccentric sleeve mounted and adjustably turnable on each eccentric, a guide member disposed about the shaft between the two sleeves, the guide member having a bore through which the shaft passes and which is of substantially greater diameter than the shaft so that the guide member is free to move transversely of the shaft, elongated projection and groove guide means acting between one of the sleeves and the guide member guiding said sleeve for movement relatively to the guide member generally radially of the shaft and elongated projection and groove guide means acting between the other sleeve and the guide member guiding such other sleeve for movement relatively to the guide member generally radially of the shaft but substantially at right angles to the aforementioned guided movement of the first mentioned sleeve relatively to the guide member.

24. Mechanism of the class described comprising a shaft having thereon two eccentrics whose high points are disposed substantially in opposite directions from the shaft axis, an eccentric sleeve mounted and adjustably turnable on each eccentric, the eccentric sleeves being disposed relatively to the respective eccentrics on which they are mounted so that when one of the eccentric sleeves has its high point in the same plane containing and in the same direction from the shaft axis as the high point of the eccentric on which it is mounted the other eccentric sleeve is substantially similarly disposed relatively to the eccentric on which it is mounted, a guide member disposed about the shaft between the two sleeves, the guide member having a bore through which the shaft passes and which is of substantially greater diameter than the shaft so that the guide member is free to move transversely of the shaft, interengaging means connected with one of the sleeves and the guide member guiding said sleeve for movement relatively to the guide member generally radially of the shaft and interengaging means connected with the other sleeve and the guide member guiding such other sleeve for movement relatively to the guide member generally radially of the shaft but substantially at right angles to the aforementioned guided movement of the first mentioned sleeve relatively to the guide member.

25. Mechanism of the class described comprising a shaft having thereon two eccentrics whose high points are disposed substantially in opposite directions from the shaft axis, an eccentric sleeve mounted and adjustably turnable on each eccentric, the eccentric sleeves being disposed relatively to the respective eccentrics on which they are mounted so that when one of the eccentric sleeves has its high point in the same plane containing and in the same direction from the shaft axis as the high point of the eccentric on which it is mounted the other eccentric sleeve is substantially similarly disposed relatively to the eccentric on which it is mounted, a guide member disposed about the shaft between the two sleeves, the guide member having a bore through which the shaft passes and which is of substantially greater diameter than the shaft so that the guide member is free to move transversely of the shaft, the guide member having a radial groove in each of its opposed faces, said grooves being disposed substantially at right angles to each other, each sleeve having an elongated guiding projection entering one of said radial grooves in the guide member in guiding relationship thereto, each of such projections being in alignment with the high point of the sleeve carrying it.

GUY O. CONNER.

REFERENCES CITED

The following references are of record in the file of this patent:

UNITED STATES PATENTS

| Number | Name | Date |
| --- | --- | --- |
| 710,777 | Hodge | Oct. 7, 1902 |
| 2,008,296 | Soldan | July 16, 1935 |
| 2,209,417 | Obermoser | July 30, 1940 |
| 2,285,534 | Ryan | June 9, 1942 |
| 2,313,551 | Hurlbut | Mar. 9, 1943 |
| 2,335,170 | Cerisano | Nov. 23, 1943 |

FOREIGN PATENTS

| Number | Country | Date |
| --- | --- | --- |
| 580,647 | France | Sept. 5, 1924 |
| 615,382 | Germany | July 4, 1935 |